United States Patent Office 3,580,807
Patented May 25, 1971

3,580,807
STEAM GENERATING ASSEMBLY FOR USE IN THE INTERIOR OF A PRESSURE VESSEL OF A PRESSURIZED WATER NUCLEAR REACTOR
Hermann Kumpf, Dusseldorf, Eller, Germany, assignor to Siemens Aktiengesellschaft, Berlin and Munich, Germany
Filed June 13, 1968, Ser. No. 736,709
Claims priority, application Germany, June 14, 1967, S 110,308
Int. Cl. G21c *15/00*
U.S. Cl. 176—55        4 Claims

ABSTRACT OF THE DISCLOSURE

Steam generating assembly for use within a pressure vessel of a pressurized water reactor includes primary fluid channels extending vertically through and above the reactor core and formed thereabove with lateral outlets. Heat exchanger modules suspended from the top of the pressure vessel above the core and between the channels comprise an upper and a lower collection chamber and straight secondary fluid conveying elements connected therebetween and having heat transfer surfaces directly exposed to the interior of the pressure vessel for engagement by a flow of heated primary fluid in a substantially horizontal direction from the lateral outlets of the primary fluid channels.

---

Figure 1:
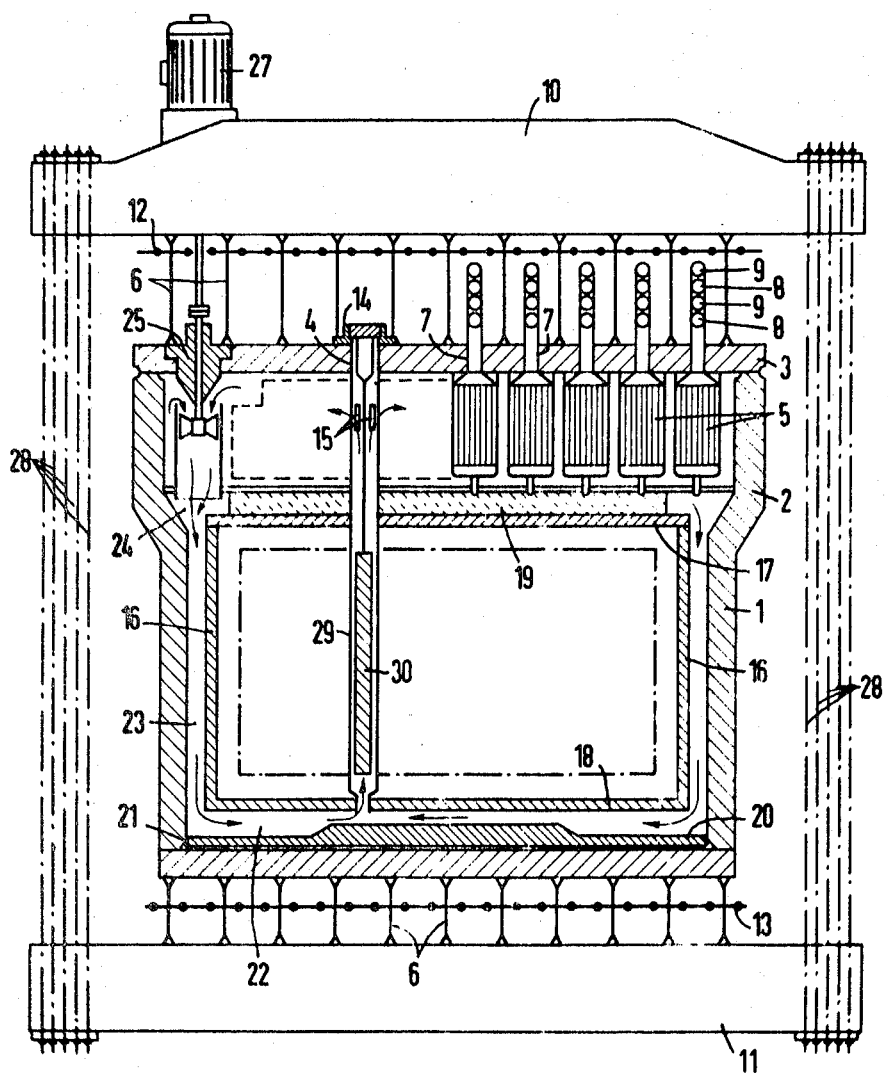

My invention relates to steam generating assembly for use in the interior of a pressure vessel of a pressurized water nuclear reactor of the type described, for example, in my application Ser. No. 614,991, filed Feb. 9, 1967 and now abandoned. Pertinent portions of the just-mentioned application are incorporated herein by reference. Steam-generated assemblies of the type described in my prior application include an outer pressure vessel within which is located a nuclear reactor and within which a primary fluid is circulated to provide heat that is to be extracted. A heat exchanger assembly is situated within the vessel for delivering the extracted heat to a secondary fluid and this assembly includes a pair of spaced enclosure means defining a pair of collection chambers for the secondary fluid, as well as a straight fluid-conveying means extending between and communicating with the pair of closure means for directing the secondary fluid from one to the other of the enclosure means. The fluid-conveying means have an exposed surface directly engageable by the primary fluid and exposed directly to the interior of the pressure vessel. The straight fluid-conveying means are formed of tubes or plates which are not contained in any housing, and the primary fluid is guided in a flow direction which is substantially perpendicular to the flow direction of the secondary fluid.

Nuclear reactors having a pressure vessel within which both the reactor core proper and the steam generator are mounted are generally known as integrated reactors. As noted in the aforementioned, now-abandoned application, it is particularly advantageous to provide a heat exchanger which is as small and compact as possible in the reactor, so that the overall dimensions of the reactor pressure vessel can be more readily controllable.

It is accordingly an object of my invention in this application to provide steam-generating assembly in an integrated reactor which has a construction that is an improvement over that of my aforementioned now-abandoned application.

It is a further object of my invention to provide such steam generator assembly for use with reactor pressure vessels that can maintain their pressure-tight characteristics by means of outer tensioning devices which are kept cold and which can be constructed directly in situ.

With the foregoing and other objects in view, I accordingly provide such a steam generator assembly wherein heat exchanger assemblies or modules of which the steam generator is comprised are suspended above the reactor core from the pressure vessel cover so that they extend between primary fluid channels passing substantially vertically through the reactor core and projecting from the upper end thereof. The projecting portions of the cooling channels located substantially at the level of the heat exchanger modules are formed with lateral outlet openings for discharging heated primary fluid therefrom.

In accordance with a further feature of the invention, the steam-generating assembly is provided in a reactor of integrated construction and is traversed by a moderating fluid consisting of heavy water. In such a reactor, due to the particular construction of the steam-generating assembly of my invention, the required amount of heavy water can be kept considerably smaller than in corresponding conventional heat exchanger assemblies located outside of the reactor vessel.

Other features which are considered as characteristic for the invention are set forth in the appended claims.

Although the invention is illustrated and described herein as embodied in steam-generating assembly for use in the interior of a pressure vessel of a pressurized water nuclear reactor, it is nevertheless not intended to be limited to the details shown, since various modifications and structural changes may be made therein without departing from the spirit of the invention and within the scope and range of equivalents of the claims.

Figure 2:
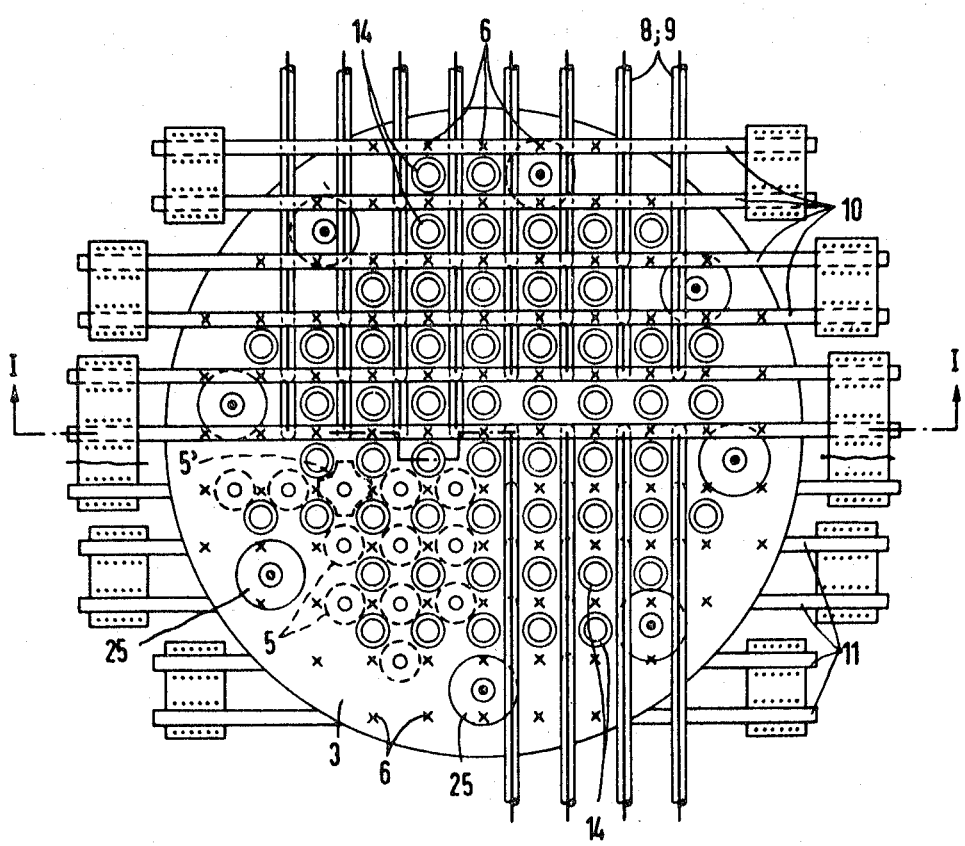

The construction and method of operation of the invention, however, together with additional objects and advantages thereof will be best understood from the following description of specific embodiments when read in connection with the accompanying drawings, in which:

FIG. 1 is a partly diagrammatic, partly sectional view of a nuclear reactor containing the steam-generating assembly constructed in accordance with my invention, taken along the lines I—I of FIG. 2; and FIG. 2 is a partly diagrammatic top plan view of FIG. 1.

The embodiment of my invention illustrated in the drawings as described hereinafter is shown in a heavy water-moderated pressurized water reactor having coolant or primary fluid channels projecting upwardly through the cover of a pressure vessel and provided thereabove with special locking devices. With the aid of specialized loading machines similar to those which are employed, for example, in the multi-purpose experimental reactor in Karlsrhue, Germany, these locking devices can be opened and the fuel elements contained in the coolant or primary fluid channels can be replaced.

Referring now more specifically to the drawings, there is shown a substantially cylindrical pressure vessel 1 having an upper portion 2 of somewhat enlarged diameter and a cover 3, the pressure vessel 1, 2, 3 being maintained pressure-tight by outer tensioning members. In the embodiment shown in the drawings only the vertical tensioning elements are shown for the sake of clarity and comprise the supports 11 and 10, as well as tensioning cables 28. By means of cooled plates 12 and 13, the operating temperature at which these tensioning elements 10, 11 and 28 are maintained is kept low. Through relatively strong spacer members 6, force is applied between the supports 10 and 11 and the pressure vessel cover and base respectively. The cylindrical portions 1 and 2 of the pressure vessel can be assembled, for example in situ of individual rings which need only be connected to one another by means of a sealing welded seam. For the individual vessel rings, the known so-called wound construction is suitable.

By means of this particular type of pressurized support of the vessel walls proper it is possible to employ an unconventional flat vessel cover 3 and to suspend therefrom the individual heat exchanger elements or modules 5, which are described more fully hereinafter. Preferably, the suspension is effected at the concentric supply ducts for the secondary fluid so that only simple bore holes 7 are required for this purpose. The sealing of these bore holes 7 with the supply ducts or tubes extending therethrough can be effected on the outside of the pressurized vessel by means of conventional specialized seals or welds. Cooling or primary fluid channels 29 containing a fuel element 30 respectively pass through the flat vessel cover 3 at respective locations 4 and are closed at the outside of the cover 3 by conventional specialized locking devices 14 which can be removed or otherwise actuated by a suitable loading machine.

The heat exchanger assembly or modules 5 are additionally carried at their lower or bottom side on a screen or shield plate 19 which is located above the moderator vessel proper of the reactor that is formed of a cylindrical portion 16, a cover 17 and a base 18. The moderator vessel 16, 17, 18 is relatively thin-walled since it is subjected to only slight pressure. Coolant circulating pumps 25 are inserted in the pressure vessel cover 3 of the reactor and are suitably connected by respective shafts with motors 27 (only one of which is shown in FIG. 1), located outside the pressure vessel 1, 2, 3. As can be seen from FIG. 1, it is unnecessary to screw or bolt the pumps 27 in a special manner because they are actually forced against the cover 3 of the pressure vessel by the compression spacer members or props. The pump 25 serves for circulating the primary fluid and is in the form of propeller pump, for example. The primary fluid from which heat is extracted serves to cool the reactor and flows along the circuit indicated by the arrows in FIG. 1. As can be seen from FIG. 1, each of the heat exchanger modules 5 is provided with its own feed water conduits 8 and conduits 9 for conveying steam away from each module.

With the structure of my invention, the heat exchanging elements of each of the modules 5 do not take the form of U-shaped tubes, as is conventional, but instead are composed of a plurality of tubes, sheets, enclosures or the like, which are situated very close to one another so as to provide, for a secondary fluid that is to be converted into steam, a uniform flow directed upwardly with respect to the axis of the reactor. At the same time, the primary reactor cooling fluid discharging from lateral openings 15 provided in the upper portion of the coolant or primary fluid channels 29 located above the nuclear fuel core defined by the dot-dash box in FIG. 1, flows in a substantially horizontal direction perpendicularly or transversely with respect to the direction of flow of the secondary fluid within the heat exchanger modules 5.

With this construction of the invention it is possible to provide approximately 2–3 times as much heat exchanging surface as can be provided by a conventional heat exchanger having U-shaped tubes and the relatively thick tubular plate required by such constructions.

As shown in FIG. 2 in top plan view, the heat exchanger modules 5 are disposed intermediate to the coolant or primary fluid channels 29. If desired, heat exchanger modules 5' of substantially cruciform cross section can be employed instead of the cylindrical modules 5 and can project into the lateral spaces between the coolant or primary fluid channels 29, so as to thereby provide a better filling factor due to the heat exchanging surfaces thereof which more closely follow the outer heat exchanging surfaces of the channels 29. As aforementioned, the channels 29 are provided with lateral openings 15 which are located at substantially the same level as that of the heat exchanger modules 5, which can be clearly seen from FIG. 1. The primary fluid heated by the fuel elements 30 that are contained within the channels 29 flows outwardly through the lateral openings 15 and traverses the heat exchanger modules 5 practically in transverse flow to that of the secondary coolant fluid flowing substantially vertically in the modules 5. The pumps 25 located on the cover 3 of the pressure vessel forces the primary fluid through the spaces 24, 23 and 22 sequentially in a downward direction, and the primary fluid is then guided into the coolant or primary fluid channels 29, only one of which is shown in FIG. 1, and flows therethrough in upward direction until it again issues from the lateral openings 15.

For the sake of clarity, the extremities of the spacer elements 6 are indicated in FIG. 2 only by dovetails. It is also noted from FIG. 2 that the feed water and steam-conveying conduits 8 and 9 respectively of the individual heat exchanger modules 5 extend out of the pressure vessel in a direction transverse to the supports 10 and 11. In each of the conduits 8 and 9 there is provided a respective stopcock or other closure device on the secondary side thereof. In the case of damage or defect it is thereby possible very simply to shut off a single heat exchanger module 5 without greatly interfering with the operation of the entire nuclear reactor. A radiation screen or shield 20 is located at the bottom side of the reactor vessel 1, 2, 3. The enlarged diameter portion 2 of the pressure vessel serves for more easily mounting the coolant or primary fluid pumps. Naturally, an arrangement of individual small heat exchanger or steam generator assemblies or modules having a height in the order of magnitude of about 1.5 meter can also be used for pressure vessels having other shapes than the shape shown in the embodiment of the figures.

My invention is obviously also not limited to a steel vessel construction, but rather can also be applied to concrete vessel constructions. The particular embodiment described and illustrated in this application has been selected because it permits relatively simple installation of not only the reactor proper but also the heat exchanger assemblies or modules with trouble-free absorption of the reactor pressures. Furthermore, in the case of the illustrated and described embodiment, this assembly of the heat exchanger assemblies or modules can be effected without any great difficulty when the reactor is shut down.

I claim:

1. Steam-generating assembly for use in the interior of a pressure vessel of a pressurized water nuclear reactor containing a reactor core comprises substantially vertically disposed primary fluid channel means extending through the core to respective locations above the core and traversible by a primary fluid heated by the core, said primary fluid channel means being formed with lateral outlets above said core, a plurality of heat exchanger modules located above the core intermediate said primary fluid channel means, said heat exchanger modules being suspended from the top of the pressure vessel and respectively comprising a pair of vertically spaced collection chambers and a plurality of individual straight secondary fluid conveying means extending in a substantially vertical direction and communicating with said pair of collection chamber for conducting a secondary fluid therebetween, said secondary fluid conveying means having heat transfer surfaces exposed directly to the interior of said pressure vessel, and means for guiding heated primary fluid discharging from the lateral outlets formed in said primary fluid channel means in a substantially horizontal direction into engagement with said heat transfer surfaces whereby heat is extracted from said primary fluid and transferred to said secondary fluid.

2. Steam-generating assembly according to claim 1, wherein said secondary fluid conveying means comprise a plurality of tubes, said heat transfer surfaces being the outer surfaces of said tubes.

3. Steam-generating assembly according to claim 1, wherein said secondary fluid conveying means comprise a plurality of plates, said heat transfer surfaces being one of the surfaces respectively of said plates.

4. Steam-generating assembly according to claim 1, wherein the reactor is of integrated construction and is traversed by a moderating fluid consisting of heavy water.

References Cited

UNITED STATES PATENTS

| | | | |
|---|---|---|---|
| 3,397,114 | 8/1968 | Deighton | 176—65X |
| 3,425,906 | 2/1969 | Weber | 176—65 |

CARL D. QUARFORTH, Primary Examiner

H. E. BEHREND, Jr., Assistant Examiner

U.S. Cl. X.R.

176—65